United States Patent [19]

Godel

[11] 4,088,745
[45] May 9, 1978

[54] SELF-AGGLOMERATING FLUIDIZED BED REACTING PROCESS

[75] Inventor: Albert Andre Godel, Paris, France

[73] Assignee: Compagnie Industrielle de Procedes & d'Applications S.A., Neuchatel, Switzerland

[21] Appl. No.: 473,304

[22] Filed: May 24, 1974

Related U.S. Application Data

[63] Continuation-in-part of Ser. No. 265,925, Jun. 23, 1972, Pat. No. 3,840,345.

[51] Int. Cl.² .............................................. B07B 4/00
[52] U.S. Cl. ............................ 423/659; 423/DIG. 16; 75/26; 23/313 FB; 201/31; 423/449; 208/153
[58] Field of Search ............... 423/659 F, 1, 445, 449; 23/313 FB; 75/26

[56] References Cited

U.S. PATENT DOCUMENTS

| | | | |
|---|---|---|---|
| 1,469,399 | 10/1923 | Treat | 48/69 |
| 1,872,883 | 8/1932 | Byrne | 201/31 |
| 2,091,587 | 8/1937 | Engler et al. | 110/36 |
| 2,175,610 | 10/1939 | Linder | 48/63 X |
| 2,421,120 | 5/1947 | Griswold et al. | 23/277 R X |
| 3,460,818 | 8/1969 | Greaves et al. | 266/21 |
| 3,605,656 | 9/1971 | Stribling | 110/36 X |
| 3,840,345 | 10/1974 | Godel | 75/26 X |

FOREIGN PATENT DOCUMENTS

| | | | |
|---|---|---|---|
| 488,276 | 11/1952 | Canada | 423/659 F |
| 566,717 | 11/1958 | Canada | 423/659 F |
| 719,453 | 12/1954 | United Kingdom | 423/659 F |

OTHER PUBLICATIONS

Hackh's "Chemical Dictionary", 4th Ed., revised, 1969, pp. 282 and 615, McGraw-Hill Book Co., New York.

Primary Examiner—Edward Stern
Attorney, Agent, or Firm—Michael J. Striker

[57] ABSTRACT

A process of reacting finely divided material in a fluidized bed supported by a circular grate in relative circular motion with regard to a cell enclosing an auxiliary bed which has a bottom in free communication with the main fluidized bed and which is in hydrostatic equilibrium with the latter, whereby slag settled on the grate is sorted and extracted.

15 Claims, 6 Drawing Figures

SELF-AGGLOMERATING FLUIDIZED BED REACTING PROCESS

CROSS-REFERENCE

This is a continuation-in part application of my copending application Ser. No. 265,925 filed June 23, 1972, now U.S. Pat. No. 3,840,345.

BACKGROUND OF THE INVENTION

This invention relates to a process of reacting finely divided material in a fluidized bed at a temperature involving self-agglomerating conditions.

It is known that, under such conditions, when products resulting from the reaction become fusible, they agglomerate selectively among themselves and cluster but do not agglomerate with the solid granulated raw material. Due to this fact, as soon as the resulting clusters have reached a certain size, they decant in form of slag down to the bottom of the fluidized bed. Thus, it is necessary, to avoid the blocking of fluidization by clustering, to eliminate this slag as soon as it is formed.

SUMMARY OF THE INVENTION

An object of the present invention is to provide a process which will permit this separation, in a state of quasi-purity, of slag formed by reaction in the self-agglomerating fluidized bed.

A further object and advantage of the invention resides in the fact that the flue dust elutriated from the reactor can be totally reinjected in the fluidized bed as it is practically free from slag.

Other objects of the present invention will become apparent in the course of the following specification.

According to the present invention, the solid granulated raw material treated in a self-agglomerating fluidized bed is contained in a reactor the cylindrical base of which includes a circular fluidization grate blown by reacting fluidizing gas, which grate constitutes a support for said solid granulated raw material. Above this grate is located a so-called "fluidization sorting cell" which is set for separation and extraction of the slag (in state of quasi-purity). Actually, this extraction takes place at the shallow end of an auxiliary fluidized bed of small depth, contained in the cell, which auxiliary fluidized bed is in communication and in hydrostatic equilibrium with the main fluidized bed.

In accomplishment of the objectives of the present invention, the cell is in relative circular motion with regard to the grate. The cell has a bottom lateral opening for the aforementioned communication causing an hydrostatic equilibrium between the two fluidized beds, and allowing the penetration of the slag into the cell.

Further gas is blown into the fluidization sorting cell over the auxiliary fluidized bed in counter-current to the slag passing therethrough, by which slag settled at the shallow end of said auxiliary fluidized bed is uncovered, sorted and extracted in quasi pure state.

The invention will appear more clearly from the following detailed description when taken in connection with the accompanying drawings showing, by way of example only, several constructions of a reactor for carrying out the method according to the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
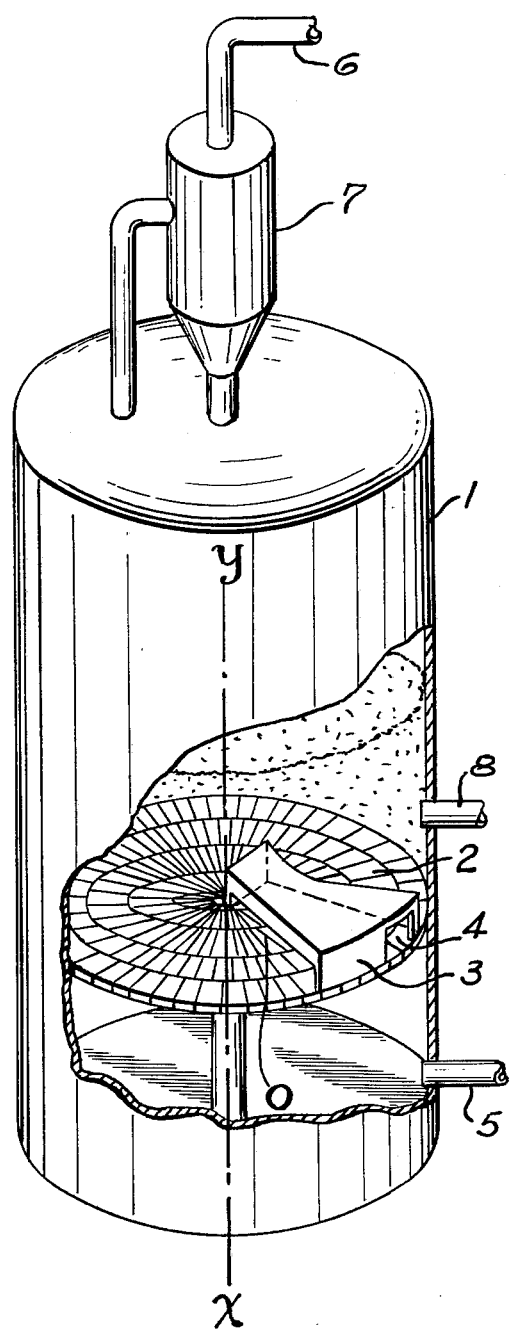
FIGS. 1 to 4 are side views, partly broken off, of different fluidization reactors.

FIG. 1 shows a cylindrical reactor 1 containing a shallow circular horizontally extending planar grate 2. Above the grate is a fluidization sorting cell 3 having a lateral bottom opening 0 and a front opening 4 for the extraction of slag toward an ash pit (not shown) located outside of the reactor. The reaction gas is introduced through the pipe 5 while gas emerging from the reaction is evacuated through the pipe 6 after having eventually passed through a cyclone 7 used to assure the collection and reinjection of flue dust into the fluidized bed. Solid granulated raw material is supplied to the reactor through the pipe 8. Such granulated or finely divided raw material may be a mineral, a fossil fuel, for instance bituminous coal.

In the above-mentioned representation of apparatus for carrying out the method of the invention, the relative motion between grate and cell results from the motion of the grate which rotates round its vertical axis $x$–$y$, the cell being fixed.

Figure 2:
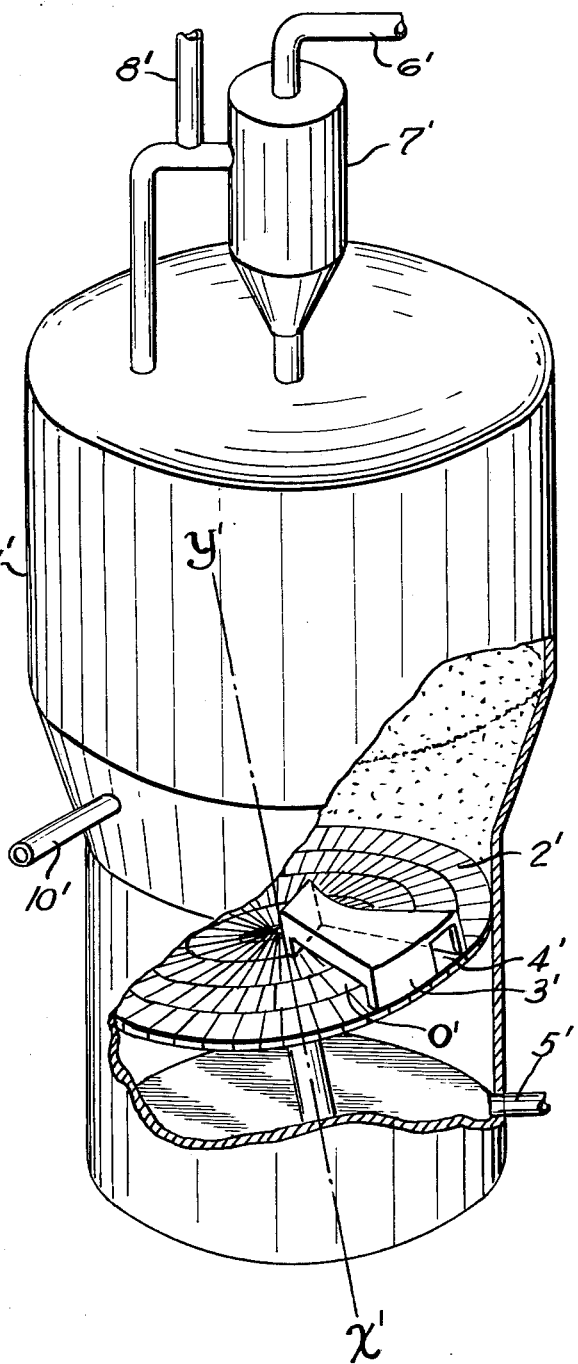

FIG. 2 shows a partly conical and partly cylindrical reactor 1' which has a circular inclined grate 2'. Above the grate is a fluidization sorting cell 3' having a lateral bottom opening 0' and a front opening 4' for the extraction of slag towards an ash pit (not shown), located outside of the reactor. Additional reaction gases at a high temperature are introduced by several lateral nozzles one of which is shown at 10'. The reaction gas is introduced through the pipe 5' while gas emerging from the reaction is evacuated through the pipe 6' after having eventually passed through a cyclone 7' used to assure the collection and reinjection of flue dust into the fluidized bed. The reactor is supplied with solid granulated raw material through a pipe 8' located at the level of the cyclone so as to assure the reinjection into the reactor of a mixture with the flue dust.

In the above-mentioned apparatus the relative motion between grate and cell results from the motion of the grate which rotates round its axis inclined $x'$ – $y'$, the cell being fixed and located at the highest level above the grate.

Figure 3:
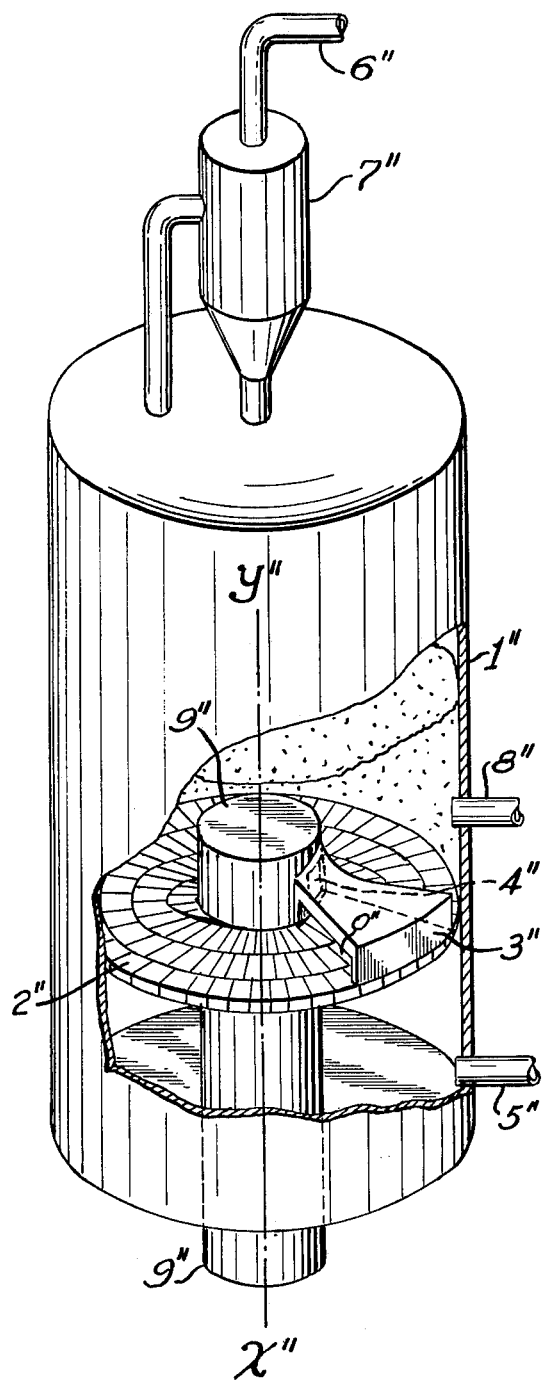

FIG. 3 shows a cylindrical fluidization reactor 1" containing a horizontal circular annular grate 2". Above it is a fluidization sorting cell 3" having a lateral bottom opening O" and a rear opening 4" for the extraction of the slag towards the interior of the reactor. This horizontal annular grate is located between the outer cylindrical wall of the reactor 1" and an interior cylinder 9" constituting an ash pit which is intended to receive slag discarded at 4". The reaction gas is introduced through the pipe 5" and the gas emerging from the reaction is evacuated through the pipe 6" after having eventually passed through a cyclone 7" used to assure the collection and reinjection of flue dust into the fluidized bed. The supply of solid granulated raw material takes place through the pipe 8".

In the aforementioned apparatus, two alternatives are possible to obtain the relative motion between grate and cell: the grate may rotate round its vertical axis $x'' - y''$, the cell being fixed, or reversely, the grate may be fixed and the cell may rotate round the axis $x'' - y''$.

Figure 4:
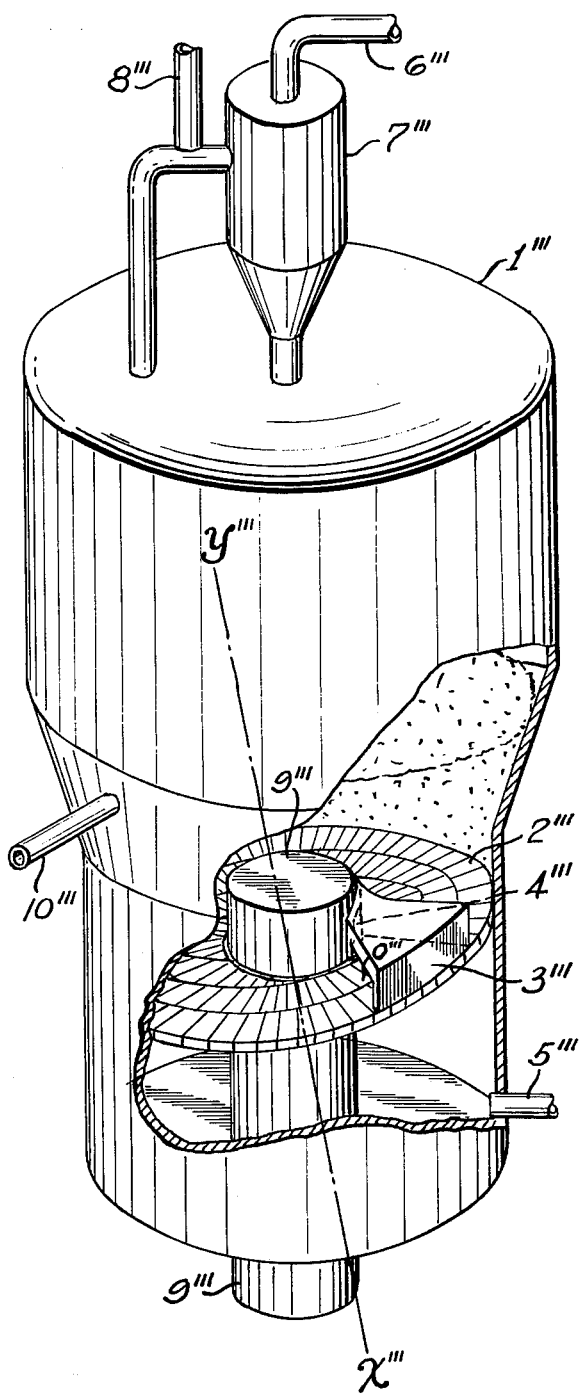

FIG. 4 shows a cylindrico-conical reactor 1''' containing a circular, annular inclined grate 2'''. Above it is a fluidization sorting cell 3''' having a lateral bottom opening 0''' and a rear opening 4''' for the extraction of slag towards an ash pit 9''' located within the reactor. Additional reaction gases at high temperature are introduced through several nozzles one of which is shown at 10'''. The inclined annular grate 2''' is located between the outer cylindrical wall of the reactor 1''' and an inner cylinder 9''' intended to receive slag discarded out at 4'''. The reaction gas is introduced through the pipe 5''' and the gas emerging from the reaction is evacuated through pipe 6''' after having eventually passed through the cyclone 7''' used to assure the collection and reinjection of flue dust into the fluidized bed after mixing with solid granulated raw material which has been introduced through the pipe 8''' at the level of the cyclone.

In the afore-mentioned apparatus, two alternatives are also possible to obtain the relative motion between grate and cell, that is to say the grate may rotate round its inclined axis $x''' - y'''$, the cell being fixed and located at the highest level above the grate, or reversely the grate may be fixed and the cell may rotate round the inclined axis $x''' - y'''$.

Figure 5:
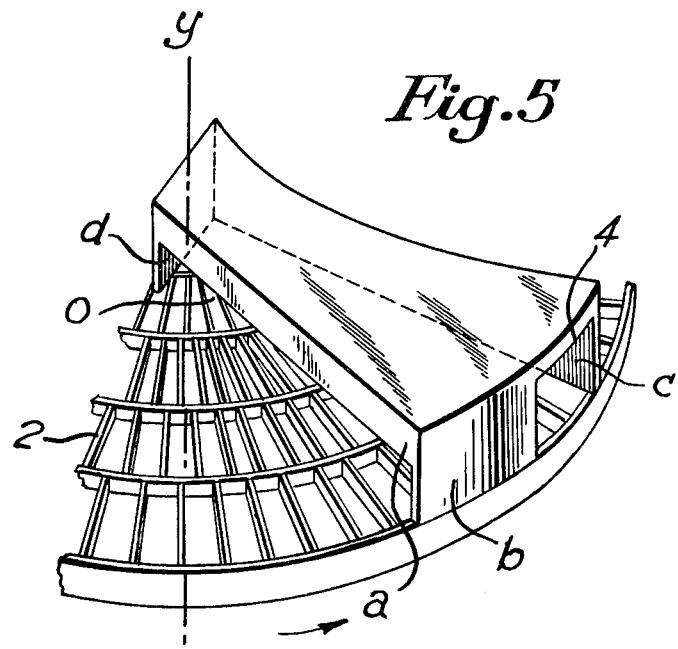
FIG. 5 is a perspective view on a larger scale of a fluidization sorting cell designed in view of an outward extraction of the slag.

FIG. 5 shows on an enlarged scale a fluidizing sorting cell made to divert the slag toward an ash pit situated outside of the reactor, as shown in FIGS. 1 and 2. This cell is placed directly above the grate 2 which is in the illustrated embodiment supposed to rotate in the direction of the arrow, namely, counterclockwise. The cell includes lateral vertical walls $a$, $b$, $c$ and $d$ upon which is mounted a top wall constituting a top of a box-like structure which is tight.

Within the cell, the grate supports a fluidized bed, described as an "auxiliary fluidized bed", which communicates by opening 0, at the base of the wall $a$ (the wall $a$ does not extend down to the grate) with the main fluidized bed located in the cylindrical reactor and extending above the cell.

The substantially radially oriented side wall $a$ is arranged to provide free introduction of slag entrained by the rotary movement of the grate. For that purpose, it is open at its base to a height which will avoid any danger of blocking by the slag. This might require an opening having a height of 1 foot or more.

The vertical lateral walls are shaped to adapt them to their particular functions.

Thus, the function of the wall $a$ is to provide by its opening 0 a communication between the auxiliary fluidized bed and the main fluidized bed. For that purpose, the wall $a$ is largely open at its base.

As far as the circumferential wall $b$ is concerned (which coincides with the cylindrical wall of the reactor), its function is to assure the discharge of the slag through the opening 4 and provide access to the ash pit located outside of the reactor.

The function of the wall $c$ is to guide the slag moved by the rotation of the grate toward the opening 4.

Actually the wall $c$ can be rectilinear and oblique relative to the direction of arrival of the slag but the best result for sweeping and rejection is produced by curving the vertical wall $c$ in accordance with the trace of a logarithmic spiral the convex side of which is directed towards the interior of the cell; this curve is particularly advantageous since it has at all points an angle which is constant relative to the direction of incidence of slag moved by the grate.

Another function of the wall $c$ is to avoid that the main fluidized bed enters into the cell by this side.

Figure 6:
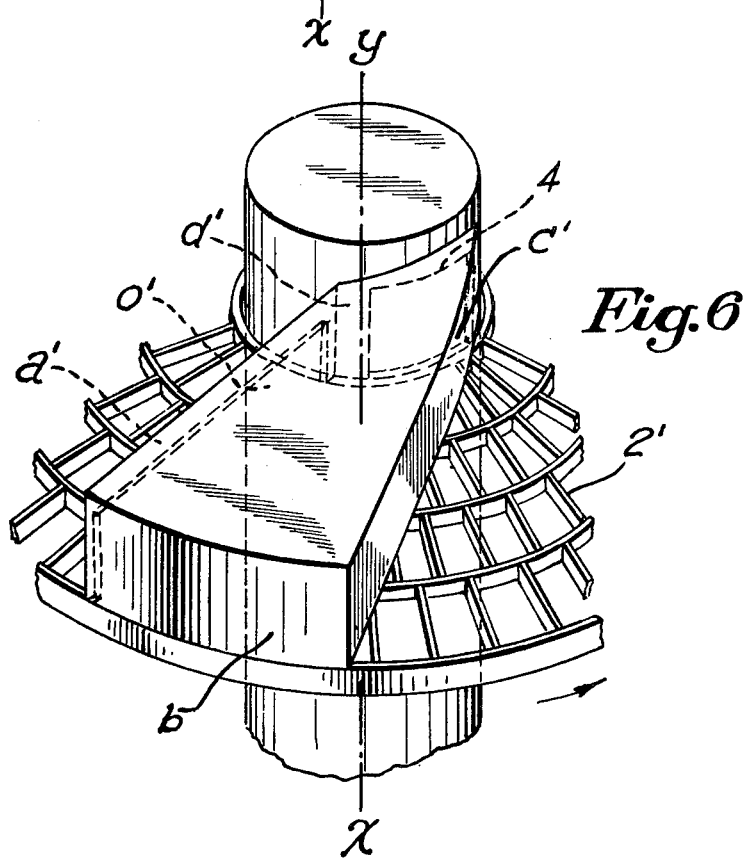
FIG. 6 is a similar perspective view of a fluidization sorting cell designed in view of an inward extraction of the slag.

FIG. 6 shows on an enlarged scale a cell made to divert the slag towards an ash pit situated at the center of the reactor, the circular grate being in this case of an annular shape, as shown in FIGS. 3 and 4. This cell is placed directly above the gate 2'.

For this representation, two alternatives may be used: the grate may rotate in the direction of the arrow, namely counterclockwise, the cell being fixed, or the grate may be fixed and the cell will rotate in the direction opposite to that shown by the arrow, that is to say clockwise, so that the slag decanted over the grate is forced into the cell.

The cell includes lateral vertical walls $a'$, $b'$ $c'$ and $d'$, upon which is mounted a top wall constituting a top of a box-like structure which is tight. Within the cell, the grate supports a fluidized bed described as an auxiliary fluidized bed which communicates by opening $0'$ at the base of wall $a'$ (the wall $a'$ does not extend down to the grate) with the main fluidized bed located in the cylindrical reactor and extending above the cell. The wall $a'$ is arranged to provide free introduction of slag entrained by the relative rotary movement existing between grate and cell. For that purpose, it is opened at its base to a height which will avoid any danger of blocking by the slag. This might require an opening having a height of 1 foot or more.

The vertical lateral walls are shaped to adapt them to their particular function.

Thus, the function of the wall $a'$ is to provide by its opening $0'$ a communication between the auxiliary fluidized bed and the main fluidized bed. For that purpose, the wall $a'$ is largely opened at its base.

The function of walls $b'$ and $c'$ is to avoid that the main fluidized bed enters the cell on their respective sides, but the major function of wall $c'$ is to guide the slag towards the central opening 4'. Actually, the wall $c'$ can be rectilinear and oblique relative to the direction of arrival of the slag but the best result for sweeping and rejection is obtained by curving the vertical wall $c'$ in accordance with the trace of a logarithmic spiral the concave side of which is directed towards the interior of the cell; as mentioned above, this curve is particularly advantageous since it has at all points a constant angle relative to the direction of incidence of slag.

The operation of the two above-described types of fluidization sorting cells is as follows:

Fluidization gases which emerge from the auxiliary fluidization bed located within the cell, cannot find any other exit except the open space 0 at the bottom of the wall $a$. They create in the cell a counter pressure which balances hydrostatically the auxiliary fluidized bed with the main fluidized bed.

The result is that the surface of the auxiliary bed is automatically limited to the height of the base of the wall $a$. Actually this is precisely the case in the vicinity of this wall, but since a large quantity of particles of the auxiliary fluidized bed is entrained by the gases towards the opening and then towards the main fluidized bed, the result is that the depth of the auxiliary fluidized bed will diminish fairly rapidly at a short distance from the wall a, so that the slag settled upon the grate becomes uncovered. Actually, this slag can then be evacuated towards the ash pit in a quasi-pure condition.

For all the examples above represented, further gas can be blown into the fluidization sorting cell over the auxiliary fluidized bed. Such gas need not be only reaction gas but eventually can be another gas and/or steam.

Due to the fact that the main fluidized bed and the auxiliary fluidized bed operate parallel to one another, and further, that the surface of the grate covered by the cell is only approximately 15% of the total surface of the circular grate, the coefficient of utilization of the surface of the grate for fluidization is maximum and so is the efficiency. For example, if, according to the invention, the reactor is used for gasification of coal, the treating power obtained will correspond to 2,000 Kg per square meter of circular grate, expressed in coal treated at atmospheric pressure, the treating power being, of course, considerably increased if gasification takes place under pressure.

From the point of view of construction, the described cell must maintain without being damaged a contact with solid granulated raw material and slag which may be at high temperatures, thus making it necessary to use walls cooled by the circulation of water; they can be protected by a refractory conducting coating, such as the one known under the trademark "Chromore".

The circular or annular grate can preferably be formed by links which are carried by an appropriate armature which is not shown since it is of known type.

As far as the operation of the reactor for carrying out the process according to the present invention is concerned, it depends to a great extent on the use for which it is intended, such as the uses described hereinafter.

In any event, a light-up fuel oil burner or gas burner is used to provide the necessary temperature for the solid granulated material lying in static manner upon the grate. It is only after heating and ignition of the static layer that it should be blown to fluidize it, then continuous feed of the solid granulated raw material takes place usually by injection into the fluidized bed at a point represented in the drawings by the numerals 8, 8', 8", 8''', depending on the construction.

When using the described reactors for carrying out certain highly endothermic reactions (such as gasification by steam), or reactions requiring a very high temperature, such as the making of cement, it is advantageous to use one or the other of the following improvements which can be used singly or in combination:

(a) Additional reaction gases may be injected at a very high temperature (which may reach 1,000° C) by known means through one or several nozzles 10' or 10''' placed above the fluidizing grate of FIGS. 2 or 4, into the fluidized bed. Then the fluidized bed becomes a so-called expanded fluidized bed which obviously will require an increased separation capacity of the cyclone above the reactor.

(b) The initial solid granulated raw material is not injected any more into the base of the reactor but into the cyclone located above it, as represented in FIGS. 2 and 4, which makes it possible to reheat it starting with calories contained in the gases emerging from the reactor and thus to introduce the raw material at a high temperature in mixture with the flue dust into the reactor. It is also possible to provide an operation which is even more methodical and which permits to recover practically in totality the calories entrained by the gases emerging from the reactor. To achieve this it is sufficient to provide above the reactor a group of several cyclones (not represented) through which flue gases pass in series and to move in countercurrent flow the solid granulated raw material which is introduced into the reactor, as well as the flue dust picked up by the cyclones.

(c) One or a plurality of conventional fluidizing grates are added in superposition above the surface of the afore-mentioned gasifying fluidized bed, in view of submitting the effluent producer gas:
either to a counter-current flow of gas with the aforementioned solid granulated raw material,
or to successive treatments in fluidized condition with various products adapted to carry out useful chemical reactions such as desulphurization, methanisation, etc.

Among the uses and the advantages of the process of the present invention, the following can be enumerated:

The process of the present invention makes it possible to carry out diverse reactions in a self-agglomerating fluidized bed under normal or pressurized conditions. These reactions include pelletizing carbonization of bituminous coal, gasification of combustibles under normal or pressurized conditions, such gas to be burned either directly under power plant boilers or desulphurized prior to its use for high efficiency power production in combined cycles or for processing in various manners.

Other possible applications concern the production of cement, the reduction of ore, etc.

What is claimed is:

1. In a process wherein finely divided materials are reacted in a fluidized main bed above a grate and at a temperature involving self-agglomerating conditions under which slag sinks gradually through said fluidized bed down to said grate, an improved method of extracting said slag from said fluidized bed, comprising the steps of providing a shallow cell which rests on said grate and overlies a portion thereof and defines with said grate an enclosed space which is open at the bottom to said grate and adapted to accommodate an auxiliary shallow fluidized bed, said cell having an aperture communicating said fluidized beds with each other and through which slag enters said space, and an opening leading to an ashpit; rotating said grate and said cell relative to each other so that fluidized bed material and slag settled on said grate enter said space through said aperture; and blowing a reacting fluidizing gas through said grate into said fluidized beds for maintaining them in hydrostatic equilibrium with one another and for sorting and extracting slag in said cell from said auxiliary shallow fluidized bed through said opening to enter the ashpit.

2. A process as defined in claim 1, wherein said cell has a substantially radially oriented side wall and a circumferential wall and wherein said aperture is provided in said side wall and said opening in said circumferential wall.

3. A process as defined in claim 1, wherein said cell has a relative circular motion about a vertical axis with reference to said grate.

4. A process as defined in claim 1, wherein said cell has a relative circular motion about an inclined axis with reference to said grate.

5. A process as defined in claim 1, wherein additional reaction gas having a high temperature is introduced into said main fluidized bed above the level of said grate.

6. A process as defined in claim 1, wherein said finely divided material is bituminous coal.

7. A process as defined in claim 1, wherein said finely divided material is a fossil fuel.

8. A process as defined in claim 1, wherein said finely divided material is a mineral.

9. A process as defined in claim 1, wherein said finely divided material is a fossil fuel, and said cell has a relative circular motion about an inclined axis with reference to said grate.

10. A process as defined in claim 7, wherein additional reaction gas having a higher temperature than said reacting fluidizing gas which flows through said grate, is introduced into said fluidized bed above the level of said grate.

11. A process as defined in claim 1, wherein said grate is planar.

12. A process as defined in claim 1 and comprising the step of blowing further gas over the auxiliary fluidized step in countercurrent to the slag passing therethrough.

13. A process as defined in claim 2, and including the step of deflecting the slag entering said space toward said opening by a vertical wall opposite said aperture and inclined relative to said radially oriented side wall.

14. A process as defined in claim 13, wherein said vertical wall opposite said aperture has an outline in form of a logarithmic spiral.

15. A process as defined in claim 5, wherein said high temperature is up to 1,000° C.

* * * * *